(12) United States Patent
Ernst et al.

(10) Patent No.: US 10,919,205 B2
(45) Date of Patent: Feb. 16, 2021

(54) METHOD AND DEVICE FOR THE PRODUCTION OF AN ELONGATED PRODUCT, AND ELONGATED PRODUCT

(71) Applicant: LEONI KABEL GMBH, Nuremberg (DE)

(72) Inventors: Christian Ernst, Weissenburg (DE); Sebastian Goss, Roth (DE); Joerg Wenzel, Roth (DE)

(73) Assignee: LEONI Kabel GmbH, Roth (DE)

( * ) Notice: Subject to any disclaimer, the term of this patent is extended or adjusted under 35 U.S.C. 154(b) by 473 days.

(21) Appl. No.: 15/820,665

(22) PCT Filed: May 20, 2016

(86) PCT No.: PCT/EP2016/061426
§ 371 (c)(1),
(2) Date: Nov. 22, 2017

(87) PCT Pub. No.: WO2016/188900
PCT Pub. Date: Dec. 1, 2016

(65) Prior Publication Data
US 2018/0117820 A1    May 3, 2018

(30) Foreign Application Priority Data

May 22, 2015    (DE) .......................... 10 2015 209 394

(51) Int. Cl.
*B29C 48/13*    (2019.01)
*B29C 48/151*    (2019.01)
(Continued)

(52) U.S. Cl.
CPC .............. *B29C 48/13* (2019.02); *B29C 48/06* (2019.02); *B29C 48/09* (2019.02); *B29C 48/151* (2019.02);
(Continued)

(58) Field of Classification Search
CPC ....... B29C 48/13; B29C 48/30; B29C 48/151; B29C 48/154; B29C 48/301;
(Continued)

(56) References Cited

U.S. PATENT DOCUMENTS 2,760,228 A * 8/1956 Francois .............. H01B 13/185
156/433
3,422,648 A * 1/1969 Lemelson ............... B21C 35/02
72/17.2

(Continued)

FOREIGN PATENT DOCUMENTS

DE    2338186 A1    2/1974
DE    2621465 A1    11/1976
(Continued)

*Primary Examiner* — Jeffrey M Wollschlager
(74) *Attorney, Agent, or Firm* — Laurence A. Greenberg; Werner H. Sterner; Ralph E. Locher

(57) ABSTRACT

A method for producing an elongated product. By an extrusion unit, a material is extruded onto a core of the elongated product as a casing having a predetermined wall strength. Downstream of the extrusion unit and while the material is still moldable, the elongated product is supplied in a conveying direction to a molding unit. A portion of the material is held by the molding unit and, from the held material, a molded part is formed in an integral manner on the casing. The formation of the molded part is thereby carried out in an advantageous manner, via a deformation of material of the casing.

22 Claims, 11 Drawing Sheets

(51) Int. Cl.
  *B29C 48/154* (2019.01)
  *B29C 48/30* (2019.01)
  *B29C 48/06* (2019.01)
  *B29C 48/09* (2019.01)
  *B32B 1/08* (2006.01)
  *B32B 3/26* (2006.01)
  *B32B 3/30* (2006.01)
  *B29L 31/34* (2006.01)
  *B29L 23/00* (2006.01)
  *H01B 13/14* (2006.01)
  *H01B 13/18* (2006.01)

(52) U.S. Cl.
  CPC .......... *B29C 48/154* (2019.02); *B29C 48/301* (2019.02); *B32B 1/08* (2013.01); *B32B 3/263* (2013.01); *B32B 3/30* (2013.01); *B29L 2023/005* (2013.01); *B29L 2031/3462* (2013.01); *B32B 2457/00* (2013.01); *B32B 2597/00* (2013.01); *H01B 13/14* (2013.01); *H01B 13/145* (2013.01); *H01B 13/146* (2013.01); *H01B 13/147* (2013.01); *H01B 13/18* (2013.01)

(58) Field of Classification Search
  CPC ....... B29C 48/0011; B32B 1/08; B32B 3/263; B32B 3/30; B32B 2457/00; B32B 2597/00; B29L 2031/3462; B29L 2023/005; H01B 13/14–148; H01B 13/18; H01B 13/185
  See application file for complete search history.

(56) References Cited

U.S. PATENT DOCUMENTS

| | | | |
|---|---|---|---|
| 3,557,403 A * | 1/1971 | Lemelson | B29C 48/30 425/71 |
| 3,928,519 A * | 12/1975 | Kashiyama | B29C 48/30 264/40.7 |
| 4,009,237 A | 2/1977 | Kimura et al. | |
| 4,110,394 A | 8/1978 | Shimada et al. | |
| 4,505,033 A * | 3/1985 | Wheeler | B29C 48/001 29/887 |
| 4,657,050 A * | 4/1987 | Patterson | B29D 23/001 138/149 |
| 5,004,574 A | 4/1991 | Sandt | |
| 5,324,557 A * | 6/1994 | Lupke | B29C 48/21 428/36.5 |
| 5,669,120 A * | 9/1997 | Wessels | A44B 18/0034 24/446 |
| 6,143,222 A * | 11/2000 | Takizawa | A44B 18/0049 264/167 |
| 6,257,863 B1 * | 7/2001 | Otte | B29C 48/30 425/381 |
| 6,610,231 B2 * | 8/2003 | Takizawa | A44B 18/0049 264/167 |
| 7,562,679 B2 | 7/2009 | Yasuda et al. | |
| 8,178,034 B2 | 5/2012 | Hegler | |
| 9,387,818 B2 * | 7/2016 | Sugimoto | H02G 3/0468 |
| 9,692,216 B2 * | 6/2017 | Sugimoto | H02G 3/0468 |
| 2010/0102489 A1 | 4/2010 | Hegler | |

FOREIGN PATENT DOCUMENTS

| | | |
|---|---|---|
| DE | 2940723 A1 | 4/1981 |
| GB | 2275363 A | 8/1994 |
| JP | S4933962 A | 3/1974 |
| JP | S49105861 A | 10/1974 |
| JP | S50158659 A | 12/1975 |
| JP | S5878736 A | 5/1983 |
| JP | H0547220 A | 2/1993 |
| JP | 2007046772 A2 | 2/2007 |
| JP | 2010520082 A | 6/2010 |
| WO | 9216347 A1 | 10/1992 |
| WO | 0207948 A1 | 1/2002 |

* cited by examiner

METHOD AND DEVICE FOR THE PRODUCTION OF AN ELONGATED PRODUCT, AND ELONGATED PRODUCT

CROSS-REFERENCE TO RELATED APPLICATION

This application is a continuation, under 35 U.S.C. § 120, of copending international application No. PCT/EP2016/061426, filed May 20, 2016, which designated the United States; this application also claims the priority, under 35 U.S.C. § 119, of German patent application No. DE 10 2015 209 394.8, filed May 22, 2015; the prior applications are herewith incorporated by reference in their entirety.

BACKGROUND OF THE INVENTION

Field of the Invention

The invention relates to a method and a device for the production of an elongated product and to an elongated product.

The term elongated product is often used to denote any elongate components which are conventionally produced using an extrusion method and in particular in the form of continuous products. Examples of elongated products are cables and tubing.

A cable typically contains an inner cable core and a sheath which surrounds the latter and is as a rule made of an insulating material. During production of the cable, further molded parts are often attached thereto, such as for example plug housings, grommets, seals or combinations thereof. Such molded parts are generally made of plastics and occasionally of a similar material to the cable sheath. An individual molded part is then fastened to the cable in the course of production of the latter, in particular to the sheath thereof. For example, a separately manufactured grommet is pushed on or a plug housing is molded on as an injection molding. Problems arising generally relate in particular to the tightness and tensile strength of the joint between the attached molded part and the sheath, particularly in those cases in which the molded part is merely pushed or placed on. More secure joining methods, such as for example encapsulation by injection molding or welding are on the other hand comparatively expensive.

Tubing is frequently of multilayer construction and in this case contains a plurality of layers, plies and/or sheaths in radial succession. In a typical embodiment, a tube contains a sheath which has been applied to, in particular extruded onto, a tube core located inside the sheath. The tube core is in this case typically hollow, i.e. contains a hollow space, and generally still exhibits sufficient temperature and dimensional stability to be supplied to an extrusion process as a core insert. The tube core then serves as a supporting member for the applied sheath. In the automotive sector in particular, corresponding tubing is used which is denoted for example reinforced tubing or tube packages and which has a multilayer structure with at least one extruded-on sheath. Electrical lines or media hoses for example are then guided within the tube. In a similar manner to the above-mentioned cables, it is sensible, depending on the application, to provide the sheath of the tube with an additional molded part. Due to the underlying principle, this is subject to the same or at least similar challenges.

SUMMARY OF THE INVENTION

Against this background, one object of the invention is to provide an improved method for producing an elongated product, in particular a cable or tube, with a molded part attached thereto. It is intended that production should be as simple as possible, while in particular at the same time ensuring maximum tightness between molded part and elongated product. Furthermore, the intention is to provide an elongated product, in particular a cable or tube, produced using the method. Furthermore, a molding unit for use in the method is also to be provided.

The method serves the production, in particular continuous production, of an elongated product, preferably a cable or tube. The elongated product is in particular flexible, i.e. pliable. In the method, first of all an extrusion unit is used to extrude a material, for example a plastics material, onto a core or indeed inner body of the elongated product in the form of a sheath with a predetermined wall thickness. The elongated product thus contains at least two parts, namely a core and a sheath extruded thereon.

Extrusion proceeds in particular such that at least in places the core of the elongated product is conveyed in particular continuously through an extrusion head of the extrusion unit. The material is fed to the extrusion head as an extruded composition and then applied by the extrusion head as a preferably uniform sheath with an initially substantially constant wall thickness. The extrusion unit furthermore in particular contains an extruder, for example a screw extruder, which provides the material as an extruded composition.

Downstream of the extrusion unit and while the material is still moldable, the elongated product is fed in a conveying direction to a molding unit. The conveying direction here corresponds in particular to a longitudinal direction in which the elongated product extends. Part of the material is then backed up by the molding unit in particular in the longitudinal direction. This is taken in particular to mean that this part of the material is held back, as it were, and thus displaced or scraped off relative to the other material. "Part of the material" is here in particular understood primarily to mean, in general, part of the overall material applied to the core. The backed-up material is then used to form a molded part in one piece on the sheath.

Through backing-up of the material, the wall thickness of the sheath is reduced downstream of the molding unit, i.e. in particular no additional material is supplied but rather sheath material is used which has already left the extrusion head. The material flow of the extrusion system does not then have to be modified. Instead, already applied material is, as it were, rearranged or reorganized by the backing-up. As a result of the backing-up, a greater wall thickness is achieved in the region of the backed-up material than downstream of the extrusion head directly after application. The molded part then conventionally has a larger diameter than a nominal diameter of the sheath directly downstream of the extrusion head, the nominal diameter resulting from the mouth orifice of the extrusion head.

The molding unit is therefore conveniently spaced from the extrusion head in the conveying direction, such that the material is backed up in a backing-up region downstream of the extrusion head and in particular upstream of and/or inside the molding unit. In this case, the material is backed up in particular beyond the diameter of the mouth orifice of the extrusion head, i.e. the diameter of the molded part is greater than the nominal diameter, i.e. greater than the wall thickness of the sheath directly after application of the material. A spacing is in this case formed between the extrusion head and the molding unit. This amounts preferably to between a few centimeters to a few tens of centimeters, i.e. about 1 to 10 cm to about 20 to 50 cm.

Alternatively, the spacing is greater and amounts to between 0.5 and 5 m. The optimum distance is dependent in particular on the hardening time of the material and the conveying speed of the elongated product.

A significant advantage achieved with the invention consists in particular in the fact that, by using part of the material of the sheath, a molded part may be produced particularly simply on the elongated product. Separate molding-on, which conventionally constitutes an additional, frequently complex method step, is advantageously dispensed with. Instead, the molded part is rather produced in one operation with the sheath by subjecting the material which is still moldable downstream of the extrusion unit to a shaping process using the molding unit. To produce the molded part, the material already in any event present on the elongated product is thus advantageously used, such that, conveniently, no additional material has to be supplied and preferably also is not supplied. Production of the elongated product is also simplified markedly thereby.

Alternatively, however, additional material is also supplied in the molding unit, whereby at least one advantage is achieved in that, due to the moldability of the sheath, the supplied material is joined optimally to the material of the sheath and is thereby joined particularly firmly, in particular materially bonded, to the sheath.

A further advantage consists in particular in the fact that the molded part is fastened particularly tightly to the sheath due to the one-piece configuration. "Tightly" is here understood to mean in particular media-tightly, i.e. impermeably with regard to penetration of gases and/or liquids. Instead of attaching the molded part separately and then for example welding it to the sheath, the molded part formed using the method according to the invention is advantageously inherently bonded to the sheath. This also results in particular from the fact that no separate material has advantageously to be supplied for the molded part, but rather the sheath material already present is shaped to form the molded part. During the entire method the backed-up material therefore preferably never stops being joined to the sheath, i.e. in particular is not detached therefrom. The molded part thus preferably never stops being a part of the sheath and is thereby consequently also joined particularly firmly thereto. In this way, the tensile strength of the arrangement of molded part and remaining sheath is in particular also improved.

In order to form the molded part simply from the material of the sheath, part of this material is backed up by the molding unit, i.e. in particular accumulated or held back and in general displaced in particular relative to the core. To this end, the molding unit is moved relative to the elongated product and positioned in such a way that the molding unit forms an obstacle for the sheath then likewise moving relative thereto. Due to the moldability of the material, the latter inevitably yields and in this way is backed up or built up at the molding unit. As the relative motion of the elongated product continues with regard to the molding unit, part of the sheath material is then, as it were, collected there and used to form the molded part. In one suitable embodiment, the molding unit is inserted to this end into the sheath, such that part of the sheath is stripped off over a longitudinal portion subsequently conveyed through the molding unit. The molding unit is then in particular a stripper unit, by which material is stripped or scraped off, i.e. backed up or indeed held back by stripping.

As a result of the backing-up, material is thus provided for forming the molded part. In this way, material is in a way removed from the actual sheath, preferably however without detaching this material completely, whereby the wall thickness of the sheath is then reduced accordingly in the conveying direction downstream of the molding unit or the sheath is even completely removed. In this respect, the molding unit then in particular has a dual function, these functions being on the one hand that the molded part is formed by means of the molding unit and on the other hand that the wall thickness of the remaining sheath also continues to be formed in a defined manner.

In what way the material is actually held back depends in particular on the depth of penetration of the molding unit into the sheath and on the adhesion of the material to the core. It is thus for example possible, even in the case of incomplete penetration into the sheath, nevertheless to hold back all the material if this withstands corresponding shear forces and displays only low adhesion relative thereto with regard to the core. In this case in particular, the molding unit is preferably introduced merely in part into the sheath and the sheath is nonetheless completely removed thereby over a specific longitudinal portion, wherein however the molding unit does not come into contact with the core and possible damage thereto caused by the molding unit is thereby advantageously avoided. In this case, a material with suitable adhesive properties is preferably selected.

The stated embodiment, in which the sheath is completely removed over a longitudinal portion of the elongated product, results in particular advantages, with a stripped longitudinal portion over which the core is then in particular bare being simply formed as early as in the production method. Such a stripped longitudinal portion is therefore also designated a free portion. This then no longer needs to be stripped in an additional step, for example in later finishing of an elongated product configured as a cable. In a suitable further development, the elongated product is moreover finished in the stripped longitudinal portion, i.e. in particular separated or divided into multiple parts. In one further development, at least one of the parts is additionally provided with a connection element, for example a plug, which is preferably produced in the manner of a molded part as described here.

In particular when producing the elongated product as a continuous product, the stripped longitudinal portions along the elongated product result in correspondingly bare longitudinal portions. When using the elongated product as a semi-finished product, conventional complex stripping is then advantageously dispensed with. A sheath which is merely reduced over a longitudinal portion is however also advantageous, since in this case the forces needed for stripping are at least lower and in addition a defined tearing point or portion is formed.

The backed-up material is not necessarily used completely to form the molded part. Instead, in a suitable alternative just part of the backed-up material is used and the remainder is for example detached and discarded. In this way, the shape of the molded part is particularly flexible in that the size of the molded part is not predetermined by the quantity of backed-up material but rather is freely selectable. In a suitable variant, the molded part thereby then takes the form of tapering of the sheath or of a recess or indentation formed therein.

The molding unit is arranged downstream of the extrusion unit, i.e. arranged at a specific distance downstream thereof. Downstream of the extrusion unit the elongated product is accordingly firstly guided over a given distance, wherein the material in particular cools. In one advantageous embodiment, the spacing is therefore adjusted and the moldability of the material is thereby adjusted. In a first variant, the spacing is adjusted in such a way that the material forms a comparatively hard surface on the outside in the manner of a skin, but is more viscous on the inside. On backing-up in the molding unit, the surface then forms a defined boundary, thereby holding the material together and advantageously preventing uncontrolled breaking or tearing off of the backed-up material. In a second suitable variant, the molding unit is on the other hand arranged directly downstream of the extrusion head. The spacing between molding unit and extrusion head is then reduced to a minimum and amounts in particular to zero. The material is then particularly readily moldable on reaching the molding unit and is accordingly particularly simple to shape into the molded part.

In a convenient further development, the molding unit is joined directly to the extrusion head or integrated therein and so forms a unit therewith, in particular a widened extrusion head which is also designated a hybrid molding unit or hybrid head. Due to the integration of the two functions of extrusion head and molding unit, the hybrid molding unit is particularly compact. The hybrid molding unit contains an extrusion portion with a mouthpiece through which the core is guided and to which the material is supplied from the extruder via ducts in order to apply the material to the core. A molding portion comprising the molding unit then adjoins the mouthpiece.

Especially where additional material is supplied to the molding unit, a further advantage arises in particular in that material supply from the extruder is markedly simplified. Thus, for example, some of the material is branched off to the molding unit via a branch from the supply to the mouthpiece. Supply of in particular molten material preferably proceeds through an additional extruder, a melt pump or a similar apparatus.

In order in particular to form the molded part solely over a predetermined longitudinal portion of the elongated product, in a preferred embodiment the molding unit is initially closed to back up the material and is opened again after formation of the molded part. In this way, a molded part is then formed from the collected material in particular merely on that longitudinal portion of the elongated product which is supplied to the molding unit when it is closed, while in the open state the elongated product is substantially unaffected by the molding unit. "Closure of the molding unit" is in this case understood in particular to mean that said unit is brought up to the elongated product in such a way that it comes into contact with the sheath, for example in the sense of biting into it, and then the material is accordingly backed up at the molding unit. "Opening of the molding unit" is in this case understood in particular to mean that the unit is accordingly moved back, such that in this open state there is no interaction between the molding unit and the sheath of the elongated product. The outer contour of the elongated product is here formed in particular mainly by the extrusion head, i.e. particularly in the open state of the molding unit, which in this case merely backs up a given quantity of material and then on opening releases a molded part formed from this backed-up material.

Preferably, multiple molded parts are formed at multiple, periodically recurring longitudinal positions of the elongated product. In particular in combination with the above-stated opening and closure of the molding unit, periodic formation of multiple molded parts is undertaken in a particularly simple manner by periodic opening and closure of the molding unit. In this embodiment, the method is particularly suitable for continuous production of an elongated product with molded parts attached to the sheath at recurring longitudinal positions, for example regularly attached holders for the elongated product or indeed longitudinal markings.

In a particularly simple variant of the method, the backed-up material is firstly merely accumulated, as described above, by the molding unit and then in particular forms a thickened portion of the sheath at the corresponding longitudinal position. In order, however, to make the molded part particularly flexible, in a preferred further development of the method the backed-up material is received in a molding chamber of the molding unit and the molded part is formed in this molding chamber. The molding chamber of the molding unit thus provides a corresponding contour, by which the backed-up material is brought into the shape intended for formation of the molded part. In this embodiment, the molding unit thus plays a crucial part in defining the outer contour of the elongated product, particularly in the region of the molded part. Here the backed-up material conforms, in particular due to its moldability, to the shape predetermined by the molding chamber. By configuring the molding chamber accordingly, virtually any desired molded parts may be produced on the sheath of the elongated product. Preferred embodiments of the elongated product then display a number of molded parts which are formed by suitable configuration of the molding chamber as a thread, flange, grommet, indentation, cone, a number of fins or a combination thereof.

The molding chamber is mounted in particular in the manner of a die on the molding unit and in a convenient variant is exchangeable, whereby the molded part formed from the sheath may be selected depending on the application of the elongated product.

In a suitable further development, the molded part is formed by filling the molding chamber with backed-up material. In this embodiment, the molded part is configured in a particular way, to the effect that a molded part with a correspondingly identical contour is formed each time due to filling of the molding chamber. In particular in the case of recurring formation of multiple similar molded parts along the elongated product, in this manner reproducibility of the molded part is ensured. The molding chamber is then completely filled with backed-up material, such that after opening of the molding unit a molded part is obtained with a defined and reproducible outer contour. Such a molded part is then in particular produced similarly to an injection molding, with the ensuing advantages.

The molding chamber is conveniently formed in that multiple mold cavities of the molding unit are brought together. In this embodiment, in particular the opening and closure of the molding unit is performed in that the multiple mold cavities are brought together for closure and so jointly form the molding chamber and, for opening, the mold cavities are accordingly guided apart from one another again, whereby the molding chamber is then also opened and the resultant molded part released. The mold cavities are preferably mounted exchangeably.

In a first suitable variant, to back up the material the mold cavities are preferably displaced perpendicular to the conveying direction and then in the brought-together state form the molding chamber. In an exemplary and particularly simple embodiment, the molding chamber comprises a cylindrical hollow space, which is formed by bringing together two semi-cylindrical mold cavities. The molding chamber conveniently comprises at least one passage, through which, in the closed state, at least the core or said core with a reduced sheath consisting of the remaining, non-backed-up material is guided. In other words, the molding unit preferably comprises an outlet aperture for conveying the elongated product in particular even when the molding unit is closed. On closure of the molding unit, the mold cavities are in this case guided towards the elongated product preferably in a perpendicular manner, or alternatively at a suitable angle, so as to bite into the sheath, the backed-up material collecting in the hollow space. In this way, a thickened portion then forms at the corresponding longitudinal position of the elongated product. In an advantageous further development, by corresponding profiling of the circumferential surface of the hollow space a thread is then formed in a particularly simple manner.

In a further suitable exemplary embodiment, the molding unit merely contains a number of walls extending in particular perpendicular to the conveying direction, the edges of which walls form a gap through which the elongated product is conveyed. By introducing the walls into the sheath of the elongated product, i.e. by adjusting a specific width of the slot to be smaller than a diameter of the elongated product downstream of the extrusion unit, material is then backed up at these walls. In this way, the molding unit then acts in particular in the manner of a stripper unit, wherein the stripped material is collected as backed-up material against the walls of the molding unit to form the molded part.

In a second suitable variant, the mold cavities are each mounted on a rotary element and are guided together and apart by rotation. This embodiment makes possible, in a particularly simple manner, periodic formation of mold cavities in the context of continuous manufacture or endless manufacture. As a result of the rotary element, depending on direction of rotation the mold cavities further comprise an additional speed component in or contrary to the conveying direction. In this way, the relative speed of the mold cavities relative to the elongated product may then in particular be adjusted, such that for example, with mold cavities which are, as it were, carried along too, the production speed is advantageously also markedly increased. Underlying this is the recognition that the conventionally mechanical inward and outward travel, in general the opening and closure of the molding unit, requires a specific, minimum amount of time, in which under certain circumstances too much material is backed up by a molding unit which continues to move in this way. To avoid this, the molding unit is therefore conveniently carried along with the elongated product. This concept is preferably also applied independently of mold cavities mounted on rotary elements, for example in the case of a molding unit opened and closed periodically transversely to the conveying direction.

In one convenient further development, the rotary elements are additionally displaceable in particular perpendicular to the longitudinal direction or at an angle thereto, i.e. may be alternately brought up to the elongated product or moved away therefrom. Since the spacing of two molded parts along the elongated product depends, when rotary elements are used, on the circumferential length thereof, i.e. on the length of the path over which the mold cavities are moved, for the spacing to be appropriately large a correspondingly large rotary element is first of all necessary. This problem is however advantageously circumvented by displaceable rotary elements, since such rotary elements are then merely moved up to the elongated product when necessary. During the manufacture process, the rotary elements then serve primarily in particular in increasing production speed by carrying along the mold cavities, whereas the spacing between two molded parts is advantageously determined by the time at which the rotary elements are moved up to the elongated product. In this way, molded parts may be produced with markedly greater spacing along the elongated product without an excessively large rotary element having to be used.

Rotation of the rotary element about an axis of rotation extending parallel or perpendicular to the conveying direction is first of all also suitable. The mold cavity mounted on the rotary element is accordingly moved around the axis of rotation. The former case, however, corresponds to displacement of the mold cavity perpendicular to the conveying direction in the manner already described above. Therefore, "a mold cavity mounted on a rotary element" is here in particular understood to mean that the rotary element is rotatable about an axis of rotation which extends perpendicular to the longitudinal direction of the elongated product, such that the mold cavity may thus be moved in the conveying direction or contrary thereto up to the elongated product.

A respective mold cavity is mounted on a rotary element, for example a turning circle, a roller or a chain, in such a way that, by rotation of the rotary element or conveying thereof, the mold cavity is moved over a specific path, in particular circumferential path, which is for example a circular path. Alternatively, however, an eccentric, elliptical or otherwise formed rotary element is also suitable, such that the associated mold cavity is moved along a corresponding path. Through in particular continuous rotation, the mold cavity is then moved in each case recurringly up to the elongated product and the molding chamber is then formed by bringing the multiple mold cavities together. It is in this case in principle conceivable, in a suitable variant, to mount a plurality of in particular also different mold cavities on a respective rotary element, such that either different molded parts are formed as required on the elongated product by means of a single molding unit or alternatively a plurality of different molded parts are formed lengthwise one behind the other.

In conjunction with the above-stated rotatable mold cavities, the contour thereof used to form the molded part is conveniently conformed to the specifically non-rectilinear movement path of the mold cavity, such that a respective mold cavity thus preferably displays a curved outer contour. In other words, the mold cavity is conformed to the circumferential path of the rotary element, whereby a correspondingly long molded part with a defined, for example rectilinear, contour is then formed when the mold cavity rolls along the elongated product.

In one convenient variant, the mold cavities are each mounted by a displacement element, i.e. in particular bearing mounted or suspended. The displacement element allows displacement and/or rotation of the mold cavity in particular on bringing together and in general in the brought-together state of the mold cavities and thereby allows a certain amount of tolerance on opening and closure of the molding chamber. Examples of suitable displacement elements are any spring elements, hydraulic elements, rails or linear bearings. The displacement elements are then configured such that the mold cavities either yield automatically on bringing together or defend moved using active actuation. In the latter case in particular, linear motors or similar actuators are also suitable as displacement elements. An essential feature of all the suitable displacement elements is in particular that these allow a variation of that path along which a respective mold cavity is moved.

This variant is particularly advantageous when combined with mold cavities fastened to rotary elements, since in this case, despite the basically curved path along which the mold cavities are moved, straight guidance then takes place at least in places on bringing together. Two mold cavities are for example brought together and pressed towards one another to form a molding chamber, such that the mold cavities are in each case displaced roughly in the direction of the axis of rotation of the respective rotary element. The path then deviates from the circular path of the respective rotary element and then contains a portion resembling a chord. The mold cavities thus travel, as it were, together with the elongated product, wherein however furthermore relative motion takes place overall in or contrary to the conveying direction. However, by this traveling together the relative speed of the molding chamber to elongated product is conveniently adjusted and in particular reduced, such that correspondingly higher production speeds are possible with an identical quantity of backed-up material per unit time. At high production speeds in particular, it is in this way also still possible readily to form molded parts which are merely of a small size of for example about twice the diameter of the elongated product.

In a particularly suitable embodiment, the mold cavities are each moved along a preferably closed path, which extends at least in places parallel to the conveying direction. The path in this case has a straight portion which extends parallel to the conveying direction, whereby the mold cavities are accordingly in places guided parallel to the elongated product and thus even at particularly high conveying speeds virtually any desired relative speed is achieved between molding unit and elongated product with a simultaneously optimally closed molding chamber.

A respective mold cavity is preferably moved by a conveyor belt, band conveyor, haulage rope or a chain, and in particular in the manner of a caterpillar drive, along the path. In this way in principle virtually any desired paths may be achieved. The essential feature, however, is that a subportion of the path extends as a straight portion parallel to the conveying direction. In this case, "extend parallel" is in particular understood to mean that a respective mold cavity is moved in or contrary to or alternately in or contrary to the conveying direction.

In the method, formation of the molded part by shaping of the sheath is achieved substantially in particular by relative motion of the molding unit with regard to the elongated product. In a particularly simple embodiment, the molding unit is first of all conveniently arranged immovably in particular relative to the extrusion unit or has a speed in the conveying direction which is lower than the conveying speed, such that then, when the elongated product is conveyed through the molding unit, the latter is moved contrary to the conveying direction relative to the elongated product. In this way, the material is then backed up upstream of the molding unit in the conveying direction, such that in particular a front molded part is formed relative to the elongated product.

In one advantageous variant, on the other hand, on backing-up of the material the molding unit is moved in the conveying direction at a predetermined speed which is greater than a conveying speed of the elongated product. In this way, material is then accordingly backed up by the molding unit downstream of the molding unit in the conveying direction, whereby a rear molded part is then again formed relative to the elongated product. In particular, by combining these two different relative motions, an elongated product cut to length after production may be formed in a particularly advantageous manner both with a front and with a rear molded part, for example with two plug housings or grommets arranged at the ends of the elongated product. Preferably, a regular elongated product portion is formed between two successive longitudinal positions in the conveying direction which is free of molded parts and in particular is guided through or past the molding unit without being affected thereby. Over this regular elongated product portion the elongated product then comprises a sheath with a correspondingly regular wall thickness. The regular elongated product portion in this case preferably has a length which is markedly greater than the length of a molded part portion on which a molded part is arranged. A respective molded part portion for example has a length in the range of a few millimeters up to a few meters. The regular elongated product portion for example has a length in the range of a few centimeters up to several tens of meters. A particularly large range of values is therefore in principle conceivable for the length ratio. For example, the regular elongated product portion between two molded parts is up to about five thousand times or up to about ten times as long as the molded part portions in each case adjoining the elongated product portion. In one possible variant the molded part portion is approximately 5 mm long and the regular elongated product portion approximately 25 m. In particular, the molded part portion is formed merely terminally, either at one end or at both ends of the elongated product. In this preferred variant the molded parts therefore form end pieces for example of a cable or indeed of a tube.

In one convenient further development, at least two mold cavities are moved along the same straight portion and in particular along the same path and the at least two mold cavities have adjustable mold cavity spacing, in particular measured along the path. In this way, two successive molded parts with a defined spacing, namely the mold cavity spacing, may be produced particularly simply on the elongated product.

In one particularly preferred further development, the mold cavity spacing is changed in particular continuously when moving the at least two mold cavities along the straight portion, whereby a front and a rear molded part are formed advantageously in particular simultaneously on the elongated product. In this case, the at least two mold cavities each belong to one of two molding chambers, which are each formed with a further mold cavity and which are moved along a suitable second path. On closure with a mold cavity spacing preferably of zero, two molding chambers are then closed which are subsequently as it were pulled apart by enlarging, or in general modifying, the mold cavity spacing in the conveying direction. In this way, preferably two correspondingly mutually spaced molded parts are then formed. In a further development, a bare longitudinal portion is suitably formed between these two molded parts at which finishing of the elongated product may proceed or conveniently proceeds.

In one preferred further development, the moldability of the backed-up material is improved in that the molding unit, in particular the molding chamber, is temperature-adjusted during backing-up, i.e. in particular heated or cooled. The respective mold cavities which form the molding chamber and with which the backed-up material is in contact are conveniently temperature-adjusted. Temperature adjustment proceeds for example such that the molding chamber is heated up or alternatively cooled down to a similar temperature to the extrusion head. In this way, the backed-up material then displays a viscosity which is particularly suitable for shaping. Temperature adjustment to a given temperature is here inter alia in particular dependent on the material of the sheath and/or the desired shaping properties, such as for example, viscosity.

In order to achieve the shape and contour of the molded part formed using the molding unit particularly accurately during and after opening of the molding chamber, the molding chamber is preferably temperature-adjusted, in particular cooled, in particular after backing-up and prior to opening. Then the backed-up material shaped into the molded part solidifies and accordingly remains in the intended shape.

The object is further achieved according to the invention by an elongated product. The elongated product produced in particular using the above-described method is distinguished in that it contains a molded part formed from the sheath, i.e. from the material used for the sheath.

Since sheath material is used for the molded part, the sheath therefore preferably has a different configuration adjacent the molded part from that in further away normal portions of the sheath, in particular a modified, specifically a reduced wall thickness. "Adjacent" here means the sheath portion directly adjacent the molded part in the longitudinal direction. "Normal portions" is understood to mean those sheath portions the geometry of which is unchanged and is predetermined by the extrusion die, in particular a nozzle, and in which therefore no material removal has taken place. The length of the adjacent region is in this case determined in that the removed sheath volume corresponds to the volume of the molded part formed from the sheath material. The elongated product conventionally has a nominal diameter in the normal portions, whereas the directly adjacent sheath portions have a smaller diameter compared with the nominal diameter.

In the corresponding elongated product the molded part is joined particularly firmly to and in particular materially bonded with the sheath. In contrast with a cast-on or injection-molded-on molded part, the particular advantage arises that the material of the molded part is not applied to the relatively cold sheath but rather is molded from the still moldable composition during production. In this way, there is no boundary layer between molded part and sheath, but rather the sheath and the molded part are formed in one piece. In the case of a cast-on or injection-molded-on molded part, however, an at most incomplete bond necessarily arises and a corresponding boundary layer between molded part and sheath. Complete melting of the sheath for the purpose of complete material bonding is in principle possible during casting or injection molding on, but it endangers the core of the elongated product, which would accordingly likewise be thermally affected and then possibly damaged. Especially during encapsulation by injection molding, mechanical loads in particular frequently also arise, in addition to thermal loading, which lead under certain circumstances to damage, for example due to the conventionally present holding pressure. With the elongated product described here, however, an in particular complete material bond is achieved with an unaffected, i.e. wholly intact core.

Through use of the molding unit, it is in general also possible to form complex geometries. In general, the molded part in particular contains a cross-section in the longitudinal direction and/or transversely to the longitudinal direction which differs from the cross-section of the elongated product, in particular in this case the wall thickness is modified over the molded part portion relative to that over a regular elongated product portion. In principle, molded parts are conceivable with any desired dimensions, i.e. wall thicknesses. A molded part in which in particular no material has been discarded preferably however has a maximum dimension transversely to the longitudinal direction which is greater than the wall thickness of the elongated product over a regular elongated product portion, i.e. over a portion without molded part. In other words, the molded part preferably has a wall thickness which amounts to a multiple of the wall thickness of the elongated product without molded part and is greater for example by up to a factor of 20.

In a first variant the molded part preferably comprises a thread. This is expediently formed peripherally around the sheath. A counterpart may therefore be screwed onto the sheath.

In further alternatives the molded part is formed as a flange or a grommet or at least comprises such elements. Furthermore, in preferred embodiments the molded part comprises a cone, a number of ribs or fins in particular mounted distributed evenly on the outer circumference or indeed one or more indentations in the manner of trough-like recesses. Complementarily thereto, raised portions are alternatively formed on the sheath circumference.

In one preferred embodiment, the elongated product is a cable and the core thereof is a cable core containing at least one conductor and in suitable variants at least one strand, one wire, a sub-cable or a combination thereof. In addition, in a suitable further development the cable core contains shielding, encasing or taping. A sheath is then extruded onto the cable core along which a number of molded parts are formed directly from the sheath.

In a preferred variant, the elongated product is a tube, in particular tube package, with a tube core enclosing a hollow space. The hollow space serves in particular for passage of one or more cables, wires or media hoses or serves directly to convey a medium.

Finally, the object is further achieved according to the invention by a device claim. For this purpose, this contains an extrusion unit and a molding unit arranged downstream thereof in the longitudinal direction.

The molding unit is in this case in particular arranged on a support, by which it may be moved recurringly, in particular periodically recurringly towards the sheath to form periodically recurring molded parts.

In one preferred embodiment, the molding unit and at least one extrusion head of the extrusion unit are combined into a hybrid molding unit.

The device further contains a control unit for actuating the support and/or the molding unit. The control unit is here in particular configured such that movement, coupled in a defined manner with an extrusion speed, of the molding unit towards the sheath is ensured.

The molding unit may in this case be used as a retrofit part for existing extrusion units or systems. The molding unit per se is likewise—also independently of the extrusion unit— considered in itself inventive.

Other features which are considered as characteristic for the invention are set forth in the appended claims.

Although the invention is illustrated and described herein as embodied in a method and a device for the production of an elongated product, and an elongated product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
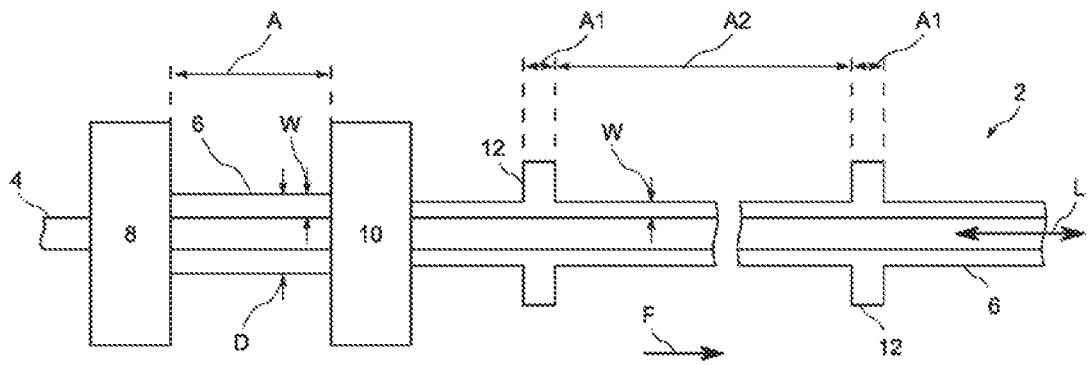
FIG. 1 is an illustration showing an elongated product, which is guided through an extrusion unit and a molding unit for forming molded parts.

Referring now to the figures of the drawings in detail and first, particularly to FIG. 1 thereof, there is shown the basic steps of a method according to the invention for producing an elongated product 2. FIG. 1 is a longitudinally sectional view of the elongated product 2 extending in a longitudinal direction L and containing an internal core 4 and a sheath 6 applied thereto. The elongated product 2 here takes the form of a cable, with a core, which accordingly is a cable core and for example contains one or more conductors, strands, wires and/or sub-cables. Alternatively, the elongated product 2 is a tube and the core 4 is then accordingly a tube core. In the exemplary embodiment shown here, the sheath 6 is in particular an outer jacket of the elongated product 2 whereas, in an alternative embodiment of the method, the elongated product 2 is further processed and is therefore produced as a semi-finished product. To apply the sheath 6, the core 4 is firstly fed in a conveying direction F to an extrusion unit 8. By means of the latter, a predetermined material, for example a plastics material, is extruded onto the core 4 as a sheath 6.

In the conveying direction F a molding unit 10 to which the elongated product 2 is fed is connected downstream of the extrusion unit 8. In this case, in particular the conveying speed, i.e. here in particular the extrusion speed, and the distance A between the molding unit 10 and the extrusion unit 8 are selected such that the material of the sheath 6 is still moldable when it reaches the molding unit 10. By the molding unit 10, a part of the material of the sheath 6 is then backed up and used to form a molded part 12. In this way, the molded part 12 is formed directly from the sheath 6 of the elongated product 2.

In FIG. 1, a molded part 12 embodied as a cylindrical thickened portion of the sheath 6 is shown by way of example. This is moreover only formed on a specific molded part portion A1 of the elongated product 2, which is adjoined by elongated product portions A2 with a sheath 6 of substantially uniform wall thickness W. In the exemplary embodiment shown here, a plurality of molded parts 12 are additionally formed at periodically recurring longitudinal positions, such that an elongated product portion A2 of a given length and in particular unaffected by the molding unit 10 extends between two molded parts 12 succeeding one another in the longitudinal direction L.

A significant step of the method according to the invention is the backing-up of sheath 6 material by the molding unit 10. This operation is illustrated by way of example in a longitudinal sectional view in FIG. 2A with reference to a first variant of the molding unit 10. The molding unit 10 here contains two walls 16 displaceable in a displacement direction V, which walls form a gap-like aperture 18 with adjustable width B. The elongated product 2 and the extruded-on, still moldable sheath 6 thereof are then fed to the molding unit 10 in such a way that the elongated product 2 is passed through the aperture 18. If the width B of the aperture 18 is now smaller than the diameter D of the elongated product 2, then part of the sheath 6 material is caught at the walls 16 and backed up or accumulated there.

Figure 2A:
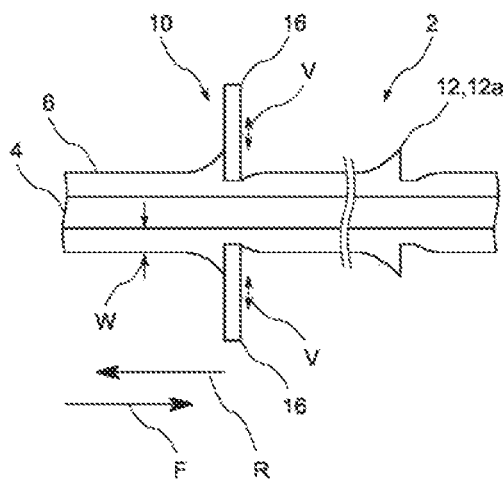
FIG. 2A is an illustration showing a first variant of the molding unit for forming front molded parts on the elongated product.

Displacement of the walls 16 in the displacement direction V in this case determines whether or not backing-up takes place. To back material up, the walls 16 are in this case brought together in such a way as to bite into the sheath 6 and thereby form an obstacle for the material conveyed in the conveying direction F with the elongated product 2. In FIG. 2A the conveying speed of the elongated product 2 and the position of the molding unit 10, which is here fixed relative to the extrusion unit 8, result in a relative motion R of the molding unit 10 with regard to the elongated product 2 which is contrary to the conveying direction F. In this way, material is backed up upstream of the walls 16 in the conveying direction F, whereby in particular a front molded part 12a is formed. In a variant which is not shown, the molding unit 10 also moves contrary to the conveying direction F, whereby the relative motion R is accordingly boosted. In another alternative, additional motion in the conveying direction F also takes place, but at a lower speed than the conveying speed, such that a front molded part 12a is again formed but comparatively slowly. This is particularly advantageous at high conveying speeds and in particular if only a little material is to be accumulated.

FIG. 2A shows the molding unit 10 in a closed state, in order accordingly to back up material. Once the molded part 12 is finished, the molding unit 10 is opened, i.e. transferred into an open state, and the molded part 12 is thereby released. In the exemplary embodiment shown in FIG. 2A, to this end the walls 16 are moved away from the elongated product 2 in the displacement direction V, such that they no longer bite into the sheath 6 and the accordingly accumulated material is automatically conveyed out of the molding unit 10 in the conveying direction F in the form of molded part 12, more precisely in the form of front molded part 12a, also known as a front part.

Figure 2B:
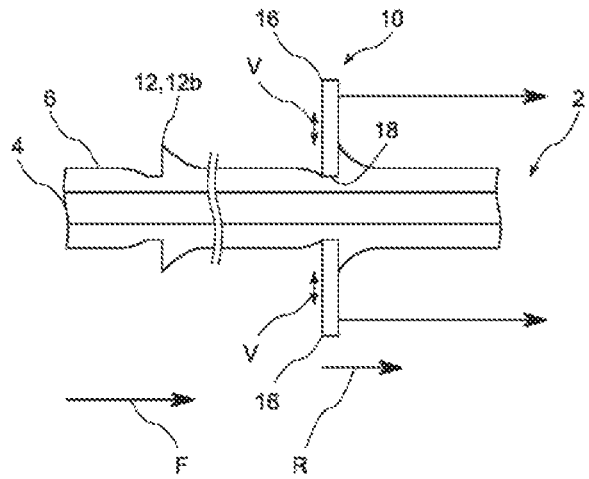
FIG. 2B is an illustration showing the use of the molding unit according to FIG. 2A to form rear molded parts.

An alternative use of the molding unit 10 according to FIG. 2A is shown in FIG. 2B. Here, the molding unit 10 is additionally moved in the conveying direction F, at a speed which is greater than the conveying speed of the elongated product 2. This results in a relative motion R between the molding unit 10 and the elongated product 2 in the conveying direction F, whereby sheath 6 material is accordingly pushed up downstream of the molding unit 10 to form the molded part 12 as a rear molded part 12b.

Figure 3:
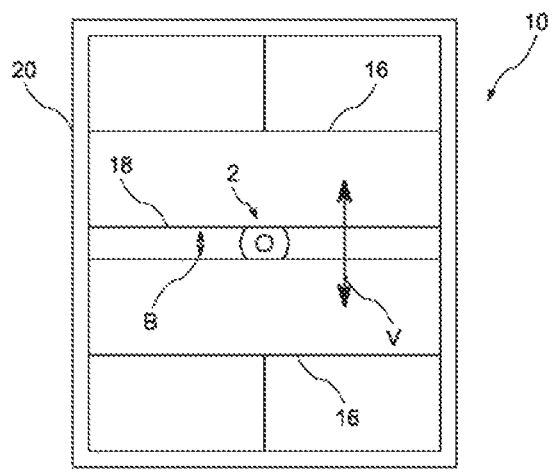
FIG. 3 is a front view of the molding unit according to FIG. 2A and of the elongated product.

FIG. 3 is a front view of the molding unit 10 of FIGS. 2A and 2B. Here the walls 16 are each mounted displaceably in a frame 20, resulting in the gap-like aperture 18. It is also clear that, in the closed state of the molding unit 10 shown here, the gap has a width B at least in the displacement direction V which is smaller than the diameter D of the elongated product 2 upstream of the molding unit 10 with the as yet unshaped sheath 6.

FIG. 3 merely shows one particularly simple embodiment from a plurality of feasible and suitable embodiments of the molding unit 10 not shown here however. A molding unit 10 is for example alternatively used in which the edge of the respective wall 16 in each case facing the elongated product 2 is not straight, as here, but rather is configured for example to result in a circular or otherwise shaped aperture 18.

Figure 4A:
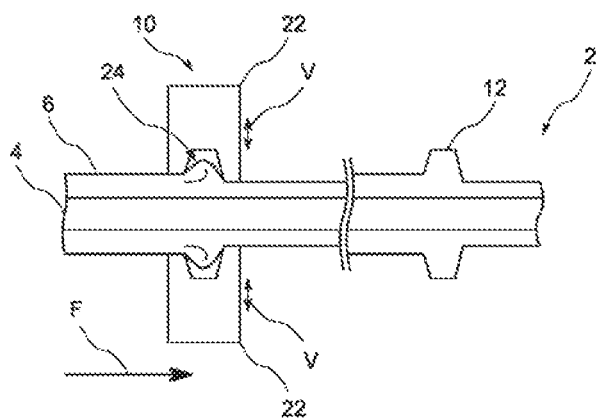
FIG. 4A is an illustration showing a second variant of the molding unit.

FIG. 4A shows a second variant of the molding unit 10, in which it contains a plurality of, here two, mold cavities 22, which, as in FIGS. 2A and 2B, are displaced in a displacement direction V in particular perpendicular to the conveying direction F. By bringing together the two mold cavities 22, the molding unit 10 is then closed and a molding chamber 24 is formed, in which the backed-up material is collected as the elongated product 2 continues to be conveyed through the molding unit 10. In the exemplary embodiment shown, the molding unit 10 is kept closed until the molding chamber 24 is completely filled with backed-up sheath 6 material and then opened, such that a molded part 12 is formed with a defined contour predetermined by the molding chamber 24. Alternatively, the molding unit 10 is moved back before the molding chamber 24 has been completely filled with material.

It is clear from FIG. 4A and also from FIGS. 2A and 2B that to form the molded part 12 the material of the sheath 6 is merely shaped and the backed-up material remains constantly joined to the remaining material not affected by the molding unit 10. This ensures a particularly good material bond between the molded part 12 and the rest of the sheath 6.

Figure 4B:
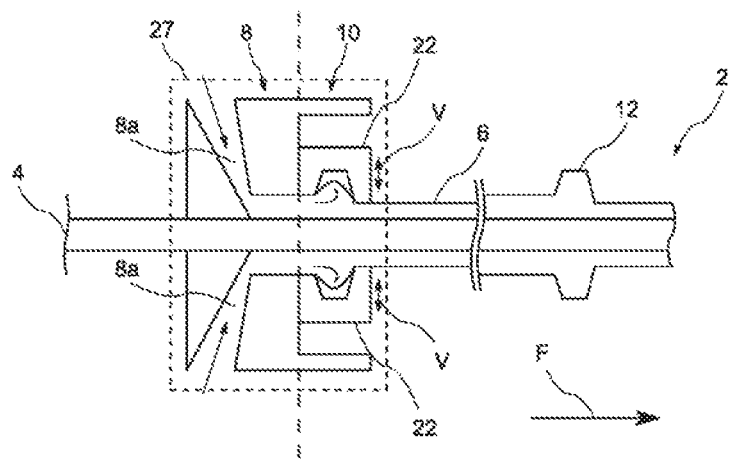
FIG. 4B is an illustration showing a hybrid molding unit.

FIG. 4B shows the molding unit 10 of FIG. 4A, wherein the spacing A between extrusion unit 8 and molding unit 10 is here zero, such that the extrusion unit 8 and the molding unit 10 are combined into a hybrid molding unit 27. In other words, the molding unit 10 is, as it were, integrated into the extrusion unit 8. The elongated product 2 is then fed first of all to an extrusion head of the extrusion unit 8 and there provided via ducts 8a with the material to form the sheath 6. The elongated product 2 then arrives directly at the molding unit 10, in which corresponding molded parts 12 are periodically formed, wherein the material advantageously has maximum moldability due to the tiny spacing A. In one alternative which is not shown, the ducts 8a are also connected with the molding chamber 24 of the molding unit 10 in order to supply further material or alternatively remove material during shaping.

Figure 5:
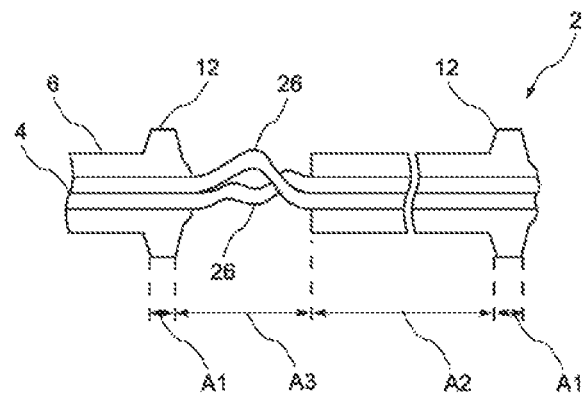
FIG. 5 is an illustration showing portions of an elongated product with molded parts.

FIG. 5 shows a longitudinally sectional view of a portion of an exemplary elongated product 2. The elongated product 2 shown here contains a plurality of molded part portions A1, each with a molded part 12 here produced as a front molded part 12a, and elongated product portions A2 adjacent a respective molded part 12 and having a regularly embodied sheath 6. Furthermore, at the front of the molded parts 12 the sheath 6 has been completely removed in that the corresponding material has been backed up by the molding unit 10 and shaped into the molded part 12. In this way, the core 4, here in particular containing two strands 26, is here visible over a sheath-less free portion A3. At these free portions A3 the elongated product 2, initially manufactured as a continuous product, is preferably and particularly simply cut to length and divided into a plurality of elongated product pieces.

Figure 6:
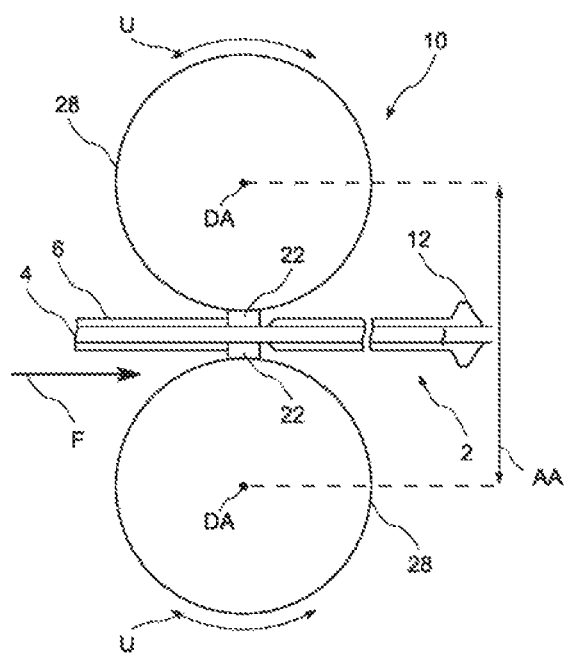
FIG. 6 is an illustration showing a third variant of the molding unit.

FIG. 6 shows a third variant of the molding unit 10 for the method according to the invention. In this case, the molding unit 10 here contains two rotary elements 28, which are each rotatable about an axis of rotation DA, which extends perpendicular to the conveying direction F. The axes of rotation DA are here in particular parallel to one another. The elongated product 2 is then conveyed through between the rotary elements 28. At the circumference of a respective one of the rotary elements 28 a mold cavity 22 is in this case arranged for forming molded parts 12 from the material of the sheath 6. To this end, the rotary elements 28 are rotated about the respective axes of rotation DA thereof, such that the mold cavities 22 are each displaced along the circumference in a direction of rotation U. Through appropriate adaptation of the speed of rotation of the rotary elements 28 and the conveying speed of the elongated product 2, the relative motion R of the mold cavities 22 relative to the elongated product 2 is then adjusted. In one embodiment, through in particular continuous rotation a plurality of molded parts 12 are then formed with given predetermined longitudinal spacing from the sheath 6 of the elongated product 2, these molded parts being spaced accordingly from one another in the longitudinal direction L.

The rotary elements 28 have a centerline distance AA perpendicular to the conveying direction F which is adjustable in the variant shown here. In other words, the rotary elements 28 are each displaceable relative to the elongated product 2, such that the mold cavities 22 travel as necessary towards the elongated product or are removed therefrom. The rotary elements 28 then serve during manufacture primarily in increasing production speed by carrying the mold cavities 22 with them. The relative spacing of two molded parts 12 is on the other hand determined by the time at which the rotary elements 28 are moved towards the elongated product.

Figure 7A:
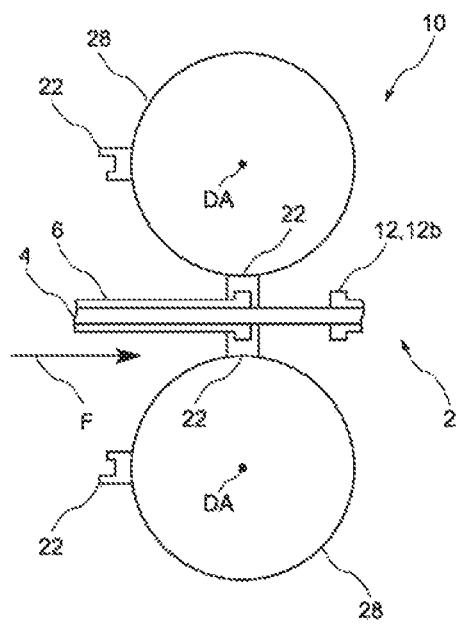
FIGS. 7A-7C are illustrations each showing a method step when using a fourth variant of the molding unit.
Figure 7B:
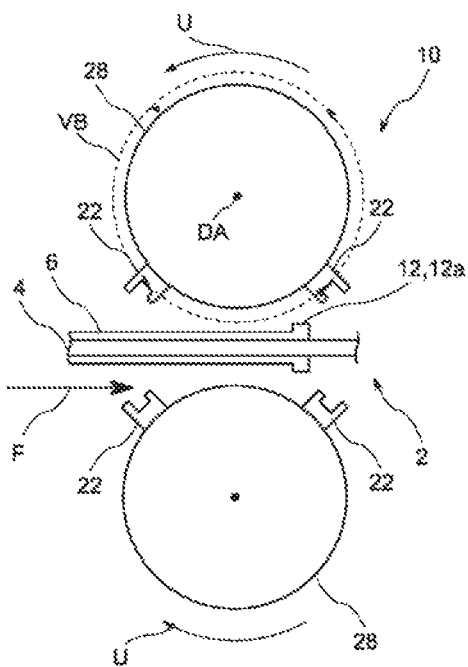
Figure 7C:
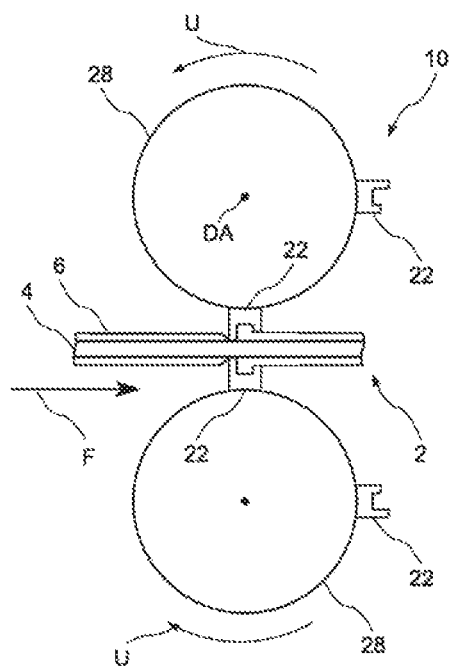

FIGS. 7A to 7C show a fourth variant of the molding unit 10 based on the arrangement according to FIG. 6. In this fourth variant a plurality of in particular different mold cavities 22 are mounted on a rotary element 28, by which mold cavities correspondingly different molded parts 12, here in particular front molded parts 12a and rear molded parts 12b, are then formed. To this end, the mold cavities 22 are moved towards the elongated product 2 by rotation in the corresponding direction and in this way different molding chambers 24 are formed, depending on the configuration.

FIG. 7A, for instance, shows the formation of a front molded part 12a by bringing the corresponding mold cavities 22 together as shown. By conveying the elongated product 2 in the conveying direction F, backed-up material of the sheath 6 is then collected in the molding chamber 24 formed and in this way the molded part 12a is formed. By rotation in the circumferential direction U shown in FIG. 7B, the molding unit 10 is then opened and the elongated product 2 is conveyed unaffected thereby in the conveying direction F, to form a regular elongated product portion A2. The mold cavities 22 are thus moved along a path VB which here is circular.

FIG. 7C then shows the formation of a rear molded part 12*b* by re-rotation in the same circumferential direction U and corresponding bringing together of the other two mold cavities 22. To back up the material, it is in particular necessary in this configuration of FIG. 7C to move the elongated product 2 relative to the molding chamber 24 contrary to the conveying direction F. This is achieved for example either in that during backing-up the rotary element 28 is rotated further, in such a way that the circumferential speed of the mold cavities 22 is greater than the conveying speed of the elongated product 2, wherein the conveying of the elongated product 2 is alternatively also interrupted, or in that the rotary elements 28 are fixed in the position shown in FIG. 7C and the elongated product 2 is conveyed back contrary to the original conveying direction F.

Figure 7D:
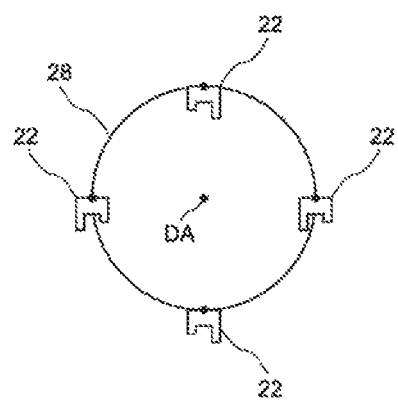
FIG. 7D is an illustration showing a rotary element with mold cavities of a fifth variant of the molding unit.

FIG. 7D shows a rotary element 28 for a fifth variant of the molding unit 10, in which the mold cavities 22 are each mounted or suspended rotatably on the rotary element 28. In this way, parallel guidance of the mold cavities is achieved, so resulting in improved contact of the two mold cavities 22 which have been brought together during formation of a corresponding molding chamber 24.

Figure 7E:
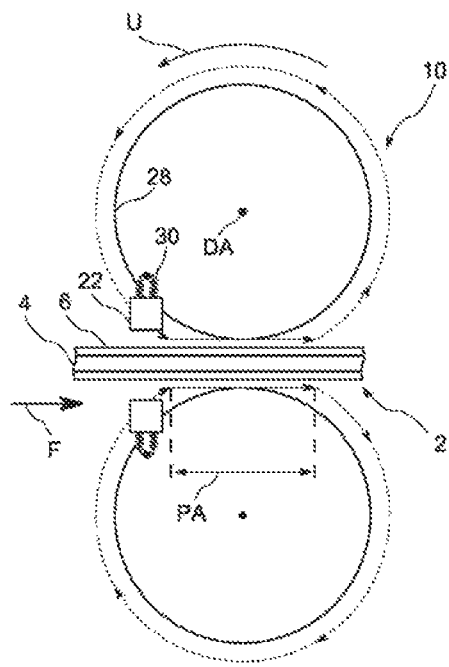
FIGS. 7E-7G are illustrations showing the method steps according to FIGS. 7A-7C with a sixth variant of the molding unit.
Figure 7F:
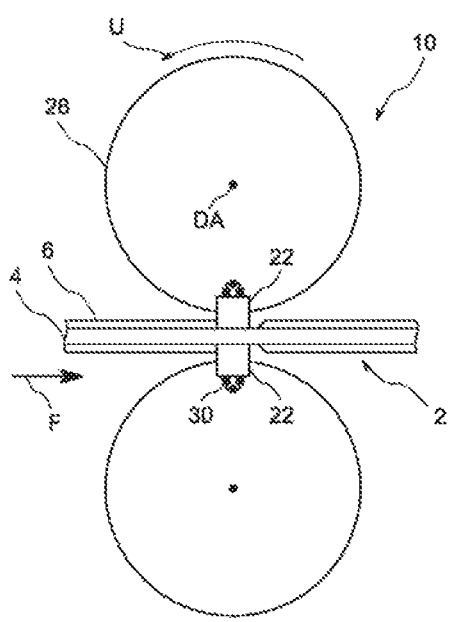
Figure 7G:
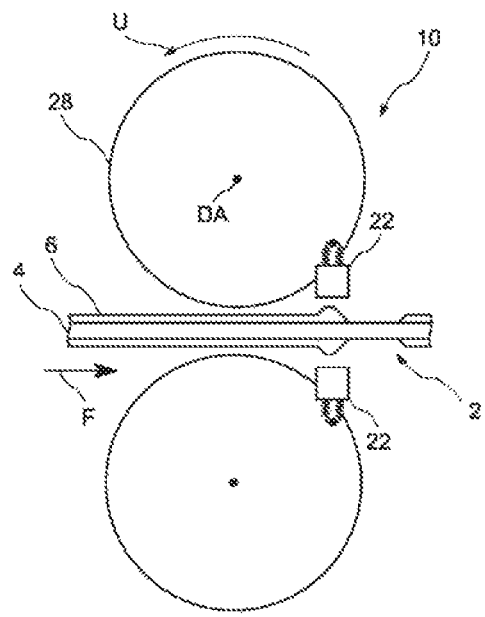

FIGS. 7E to 7G show a sixth variant of the molding unit 10 in which the mold cavities 22 are suspended rotatably, as in FIG. 7D, and additionally are also displaceably mounted. To this end, each mold cavity 22 is displaceable by way of a displacement element 30. In the exemplary embodiment shown here, the displacement elements 30 take the form of spring elements. When two mold cavities 22 are brought together, they are then displaced relative to the rotary element 28, resulting in corresponding deviation from the circular path and displacement of the mold cavities instead on a path VB which extends in places parallel to the conveying direction F, namely over a parallel portion PA. The mold cavities 22 are thus displaced as they approach the elongated product 2, here towards the axis of rotation DA, then guided along the parallel portion PA parallel to the elongated product 2 and subsequently raised again, wherein the displacement element 30 is moved back into the starting position. As a result of the additional rotatable embodiment of the mold cavities 22, advantageous parallel guidance is then achieved despite the rotating rotary elements 28.

Figure 8A:
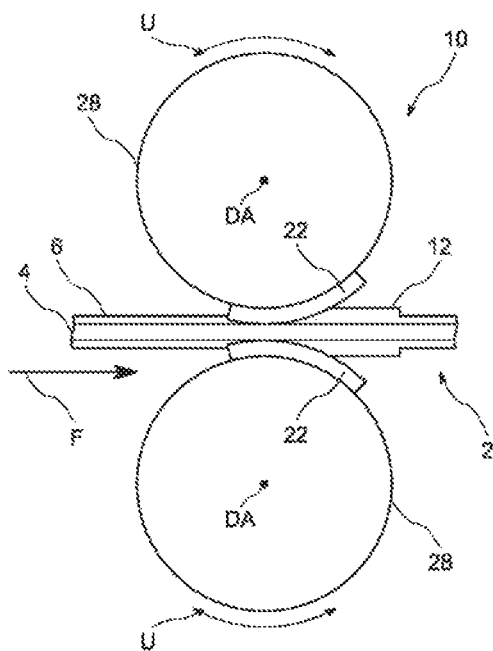
FIG. 8A is an illustration showing a seventh variant of the molding unit.

FIG. 8A shows a seventh variant of the molding unit 10 which is similar to the embodiments shown in FIGS. 6 and 7A to 7F in that here too mold cavities 22 are displaceable in a circumferential direction U by rotating rotary elements 28. The mold cavities 22 are here embodied in particular with a curved outer contour K, in order, to form a long molded part 12, to translate the rotation, i.e. displacement over a curved path VB, into a straight molded part contour.

Figure 8B:
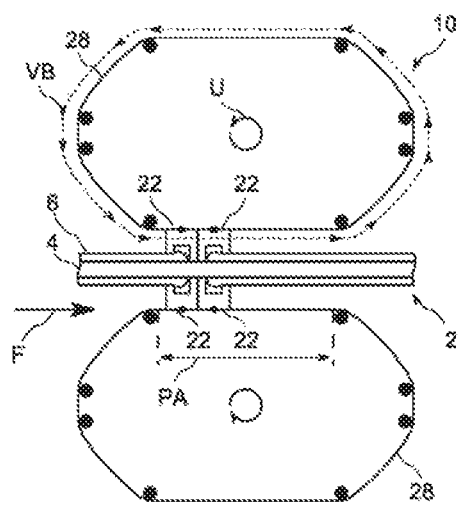
FIGS. 8B-8D are illustrations each showing a method step when using an eighth variant of the molding unit.
Figure 8C:
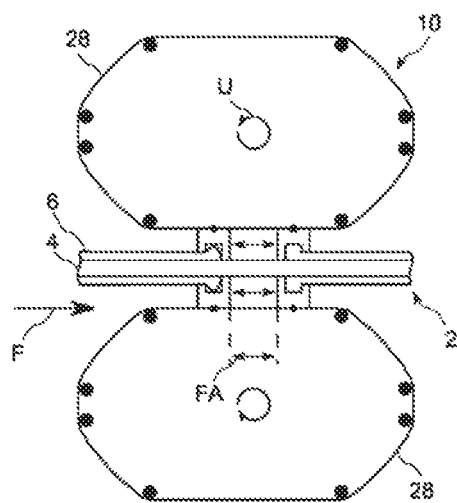
Figure 8D:
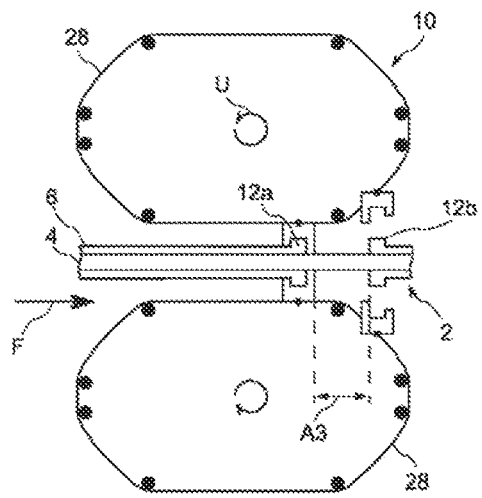

FIGS. 8B to 8D each show a method step for forming both a rear and a front molded part 12 by means of an eighth variant of the molding unit 10. The rotary elements 28 are here configured as chains, belts or conveyor belts in the manner of a caterpillar track, whereby the mold cavities 22 are moved on a substantially arbitrarily configurable path VB, which is roughly octagonal in the example shown. The path VB here contains a parallel portion PA, over which the mold cavities 22 are guided parallel to the elongated product 2, in particular in the brought-together state.

In the example of FIGS. 8B to 8D two mold cavities 22 are moved in each case by means of one rotary element 28, wherein one of the cavities serves to form a front molded part 12*a* and the other to form a rear molded part 12*b*. In order additionally in particular to form a free portion A3, or alternatively an elongated product portion A2, between these two molded parts 12*a*, 12*b*, the two mold cavities 22 are displaceable relative to one another along the path VB. In other words, the mold cavities 22 mounted on a respective rotary element 28 display a mold cavity spacing FA relative to one another which is adjustable. One of the two mold cavities 22 is displaced, when brought together with the associated mold cavity 22 of the other rotary element 28, in the conveying direction F, such that the mold cavity spacing FA is enlarged and the free portion A3 is formed. The total of four mold cavities 22 thus form two molding chambers 24, which are displaced relative to one another.

Figure 9A:
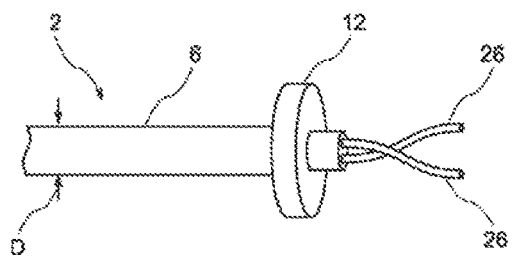
FIGS. 9A-9F are illustrations each showing a variant of the elongated product in the form of a cable with a molded part.
Figure 9B:
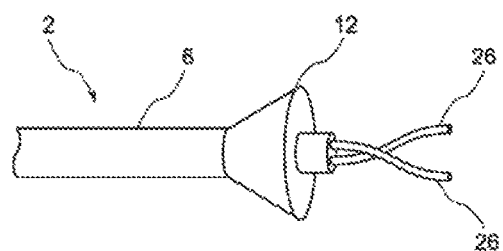
Figure 9C:
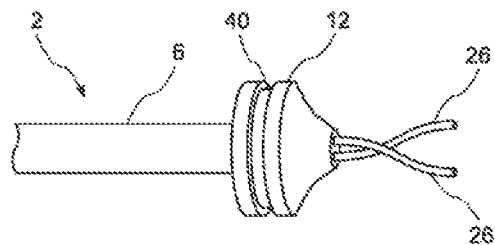
Figure 9D:
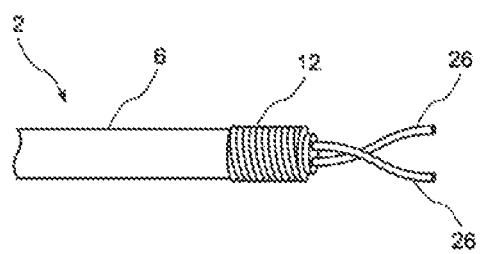
Figure 9E:
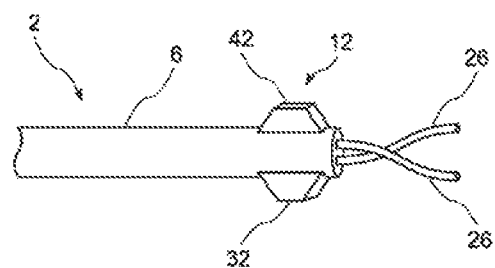
Figure 9F:
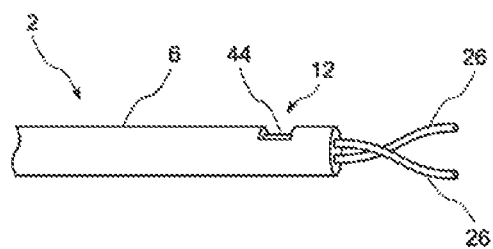

FIGS. 9A to 9F each show one exemplary embodiment of the elongated product 2 embodied as a cable, which elongated product was produced using the method according to the invention. The cables shown here merely by way of example each comprise a cable core, i.e. here core 4 with a plurality of strands 26 surrounded by a common sheath 6. Different molded parts 12 are in each case formed from the latter. For instance, FIG. 9A shows a disc-shaped or cylindrical molded part 12, while in FIG. 9B a conical molded part 12 is formed from the sheath 6. In FIG. 9C the molded part 12 is a sealing element with a circumferential groove 50, i.e. a peripheral groove, for example for insertion into a housing front, not shown. In FIG. 9D the molded part 12 takes the form of a thread. In FIG. 9E the molded part 12 comprises a plurality of fins 52 extending in the longitudinal direction L, which extend radially outwards from the sheath 6. Finally, FIG. 9F shows a recess 54 in the sheath 6 which was produced in particular by detaching the backed-up material partially or completely from the sheath 6.

Figure 10:
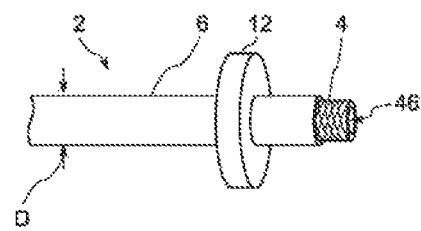
FIG. 10 is an illustration showing a variant of the elongated product in the form of a tube with a molded part.

FIG. 10 shows an exemplary embodiment of the elongated product 2 taking the form of a tube produced using the method according to the invention. The tube shown here merely by way of example contains a core 4, i.e. here a tube core. This for example contains an inner sheath, not described in any greater detail, and braid applied thereto. In general in a tube the core 2 encloses a hollow space 46. A sheath 6 has been applied to the core 4, from which sheath a molded part 12 has been formed. Due to the underlying principle, those variants of the molded part 12 which are shown in FIGS. 9A to 9F may also be produced using an elongated product 2 in the form of a tube.

The large number and variety of the exemplary embodiments of the elongated product 2 shown make it clear that virtually any desired molded parts 12 may be formed from the sheath 6 by appropriate shaping of the molding unit 10.

The invention claimed is:

1. A method for producing an elongated product, which comprises the steps of:
   continuously conveying a core of the elongated product through an extrusion head of an extrusion unit;
   extruding, via the extrusion unit, a material with a constant flow rate onto the core in a form of a sheath with a predetermined substantially constant wall thickness;
   feeding the elongated product in a conveying direction to a molding unit downstream of the extrusion unit and while the material is still moldable;
   backing up in the conveying direction part of the material via the molding unit by displacing part of the material relative to a remaining part of the material resulting in backed-up material; and
   forming a molded part from the backed-up material in one piece on the sheath.

2. The method according to claim 1, which further comprises backing up the backed-up material in a backing-up region downstream of the extrusion head in the conveying direction with the molding unit.

3. The method according to claim 1, wherein the molding unit is closed to back up the material and is opened after formation of the molded part.

4. The method according to claim 1, which further comprises forming multiple molded parts at multiple, periodically recurring longitudinal positions.

5. The method according to claim 1, which further comprises receiving the backed-up material in a molding chamber of the molding unit and the molded part is formed in the molding chamber.

6. The method according to claim 5, which further comprises forming the molded part by filling the molding chamber with the backed-up material.

7. The method according to claim 1, which further comprises completely removing the sheath over a longitudinal portion of the elongated product using the molding unit and a free portion is thereby formed.

8. The method according to claim 7, wherein the elongated product is subsequently finished over the free portion.

9. The method according to claim 5, wherein the molding chamber is formed in that multiple mold cavities of the molding unit are brought together.

10. The method according to claim 9, which further comprises displacing the mold cavities to back up the material and in a brought-together state the mold cavities form the molding chamber.

11. The method according to claim 9, which further comprises mounting each of the mold cavities on a rotary element and the mold cavities are guided together and apart by rotation of the rotary element.

12. The method according to claim 9, wherein each of the mold cavities has a curved outer contour which forms a long molded part.

13. The method according to claim 9, which further comprises mounting each of the mold cavities by a displacement element and the mold cavities are displaced and/or rotated by means thereof at least to bring them together.

14. The method according to claim 9, which further comprises moving each of the mold cavities along a path which extends at least in places parallel to the conveying direction.

15. The method according to claim 14, which further comprises moving at least two of the mold cavities along a same straight portion and the at least two mold cavities have adjustable mold cavity spacing.

16. The method according to claim 15, which further comprises changing the adjustable mold cavity spacing when moving the at least two mold cavities.

17. The method according to claim 1, wherein the backing-up of the material is achieved by moving the molding unit in the conveying direction at a predetermined speed which is greater than a conveying speed of the elongated product, to form a rear molded part.

18. The method according to claim 1, which further comprises forming a regular elongated product portion which is free of molded parts between two successive longitudinal positions in the conveying direction.

19. The method according to claim 1, which further comprise temperature adjusting the molding unit on backing-up of the material.

20. The method according to claim 2, which further comprises temperature adjusting the molding unit prior to opening of the molding unit.

21. The method according to claim 1, further comprising providing the core as a cable core with a conductor for defining the elongated product as a cable.

22. The method according to claim 1, further comprising providing the core as a tube core for defining the elongated product as a tube.

* * * * *